United States Patent [19]

Shinozaki et al.

[11] Patent Number: 4,762,629

[45] Date of Patent: Aug. 9, 1988

[54] ELECTROLYTE FOR ELECTROLYTIC CAPACITOR

[75] Inventors: Fumihiko Shinozaki; Yutaka Yokoyama, both of Ome, Japan

[73] Assignee: Nippon Chemi-Con Corporation, Tokyo, Japan

[21] Appl. No.: 26,748

[22] Filed: Mar. 17, 1987

[30] Foreign Application Priority Data

Mar. 20, 1986 [JP] Japan .................................. 61-62793

[51] Int. Cl.$^4$ .............................................. H01G 9/00
[52] U.S. Cl. ..................................... 252/62.2; 361/433
[58] Field of Search .................... 252/62.2; 361/433 E

[56] References Cited

U.S. PATENT DOCUMENTS 3,547,423  12/1970  Jenny et al. ...................... 361/433 E
4,046,652  9/1977  Pistorius et al. ...................... 204/78

Primary Examiner—John F. Niebling
Assistant Examiner—Kathryn Rubino

[57] ABSTRACT

An electrolyte for an electrolytic capacitor is disclosed containing a fluorocomplex acid salt of piperazine or piperazine derivatives as solute within an aprotic solvent. The electrolyte exhibits high conductivity while eliminating the undesirable side effects caused by the presence of water.

3 Claims, No Drawings

ELECTROLYTE FOR ELECTROLYTIC CAPACITOR

FIELD OF THE INVENTION

An electrolyte for an electrolytic capacitor containing within an aprotic solvent a fluorocomplex acid salt of piperazine or piperazine derivative as solute.

An electrolyte for an electrolytic capacitor according to the invention may conveniently be prepared by adding one equivalent amount of piperazine or piperazine derivative to an aqueous solution of fluorocomplex acid for reaction with subsequent vacuum drying to obtain an anhydrous salt and then dissolving said anhydrous salt to an aprotic solvent until a desired conductivity is obtained, for example, as an approximately 10% by weight solution.

BACKGROUND OF THE INVENTION

Hitherto, organic acids or its salts and glycol series pastes have been principally used as an electrolyte for electrolytic capacitor for general purposes. The latest expansion of utilization for the electronic instruments requires more improvement and advancement in the reliability and performance of the capacitor entailing solving the undesired problem of the presence of water in the paste, and as a result, an electrolyte using an aprotic solvent in place of organic acid and its salt and glycol paste has become attractive.

The greatest subject of research of the aprotic solvent system electrolyte is how to obtain an electrolyte of high conductivity, and to achieve this, an organic carboxylic acid or its salt which is very soluble in the aprotic solvent and has a high degree of dissociation has been researched as a primary candidate but has not yet been successful. To solve the matter and obtain a high conductivity, a solvent which produces water has resulted from the reaction between acids and alcohols or glycols and even water is incorporated into the aprotic solvent with still insufficient conductivity, increments of water and solute contents with poor reliability at the elevated temperature as disclosed in the Japanese patent publications Nos. 55-3989, 57-56763, 58-32769 and the U.S. Pat. No. 4,117,531.

After extensive research and studies to obtain an electrolyte which is substantially a nonaqueous system electrolyte and has a high conductivity with use of an aprotic solvent but without using any solvent which forms water in reaction between acids and alcohols with glycols, it has been discovered that a fluorocomplex acid salt of piperazine or piperazine derivative has a high solubility in the aprotic solvent with an enhanced releasability and provide a high conductivity.

SUMMARY OF THE INVENTION

Thus, a principal object of the invention is to provide an electrolyte of substantially non water series high conductivity with use of the aprotic solvent.

An electrolyte for an electrolytic capacitor according to the invention is characterized by containing a fluorocomplex acid salt of piperazine or piperazine derivative in the aprotic solvent as solute.

PREFERRED EMBODIMENTS OF THE INVENTION

The fluorocomplex acid salt of the piperazine or piperazine derivative according to the invention is represented by the following general formula,

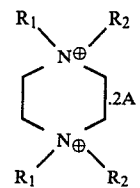

in which $R_1$ and $R_2$ are hydrogen atoms, alkyl groups having 1 to 8 carbon atoms, $R_1$ and $R_2$ integrally form a bridged alkylene group and A is a fluorocomplex acid.

The piperazine derivative to be preferably used in the invention may be selected from the following but not limited thereto:

N,N'-dimethylpiperazine, N,N'-tetramethylpiperazinium, N,N'-dihexylpiperazine, triethylenediamine (or 1,4-ethylenepiperazine), N,N'-dimethyltriethylenediaminium.

The fluorocomplex acid to be used in the invention may be tetrafluoroboric acid ($HBF_4$) or hexafluorophosphoric acid ($HPF_6$).

The aprotic solvent to be used in the invention may be selected from the following but not limited thereto:

(1) Amide system solvent:
N-methylformamide, N,N-dimethylformamide, N-ethylformamide, N,N-diethylformamide, N-methylacetamide, N,N-dimethylacetamide, N-ethylacetamide, N,N-diethylacetamide, hexamethylphosphorinamide (2) Oxide compounds:
dimethyl sulfoxide (3) Nitrile compounds:
acetonitrile (4) Cyclic esters, cyclic amides:
γ-butyrolactone, N-methyl-2-pyrrolidone, ethylene carbonate, propylene carbonate.

An electrolyte for an electrolytic capacitor according to the invention may conveniently be prepared by adding one equivalent amount of piperazine or piperazine derivative to an aqueous solution of fluorocomplex acid for reaction with subsequent vacuum drying to obtain an anhydrous salt and then dissolving said anhydrous salt to an aprotic solvent until a desired conductivity is obtained, for example, as an approximately 10% by weight solution.

However, as to the piperadinium compound, according to the conventional method an alkylpiperazine is reacted with an alkylhalogenide to obtain a piperaziniumhalogenide and the piperaziniumhalogenide is reacted with a silver salt of fluorocomplex acid to obtain a fluorocomplex acid piperazinum, and it is dissolved in a desired aprotic solvent to be able to obtain the electrolyte.

(Examples 1 to 10)

An electrolyte for an electrolytic capacitor according to the invention will be exemplified in the following with 10% by weight solution for fluorocomplex acid salt of various piperazine or piperazine derivatives with respect to the conductivity as shown in Table 1.

Further, as a comparative example the conventional standard electrolytes composed of 78% by weight of ethylene glycol, 10% by weight of water and 12% by weight of ammonium adipate are shown also in Table 1.

TABLE 1

| Example | Solute compound | Aprotic Solvent | Conductivity (ms/cm) |
|---|---|---|---|
| 1 | piperazine tetrafluoroborate 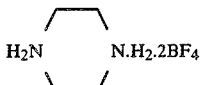 | N,N—dimethylformamide | 19.0 |
| 2 | N,N'—dimethylpiperazine tetrafluoroborate 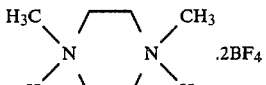 | acetonitrile | 26.2 |
| 3 | N,N'—dihexylpiperazine tetrafluoroborate 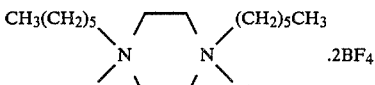 | α-butyrolactone | 10.5 |
| 4 | N,N,N',N'—tetramethylpiperazinium tetrafluoroborate 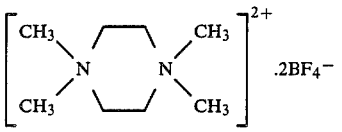 | dimethylsulfoxide | 9.5 |
| 5 | N,N'—dimethyltriethylene diaminium tetrafluoroborate 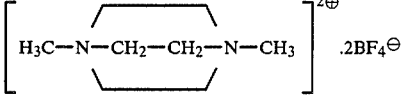 | propylene carbonate | 7.7 |
| 6 | piperazine hexafluorophosphate 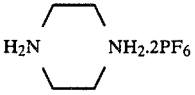 | α-butyrolactone | 10.3 |
| 7 | N,N'—dimethylpiperazine hexafluorophosphate 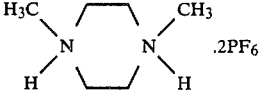 | N—methylpyrrolidone | 7.1 |
| 8 | N,N'—dihexylpiperazine hexafluorophosphate 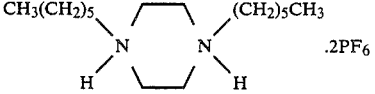 | acetonitrile | 24.1 |
| 9 | N,N,N',N'—tetramethylpiperadinium hexafluorophosphate | dimethyl sulfoxide | 7.9 |

TABLE 1-continued

| Example | Solute compound | | Aprotic Solvent | Conductivity (ms/cm) |
|---|---|---|---|---|
| 10 | $\left[\begin{array}{c}CH_3\diagdown\phantom{xx}\diagup CH_3\\ N\phantom{xx}N\\ CH_3\diagup\phantom{xx}\diagdown CH_3\end{array}\right]^{2\oplus} \cdot 2PF_6^{\ominus}$ N,N'—dimethyltriethylenediaminium hexafluorophosphate | | N—methylformamine | 13.1 |
| Ref. | $\left[CH_3-N-CH_2-CH_2-N-CH_3\right]^{2\oplus} \cdot 2PF_6^{\ominus}$ ethylene glycol water ammonium adipate | 78% by weight 10% by weight 12% by weight | | 6.7 |

The high-temperature load test obtained at 16 WV 180 micro F for electrolytes exemplified in examples 1 to 10 and the comparative example are shown as the mean value of 10 load tests in Table 2.

TABLE 2

| | Initial Value | | | 110 deg. C. 1000 hours | | |
|---|---|---|---|---|---|---|
| Example | Capacity $\mu F$ | tan $\delta$ | Leakage Current $\mu A$ | Capacity $\mu F$ | tan $\delta$ | Leakage Current $\mu A$ |
| 1 | 182 | 0.047 | 0.60 | 169 | 0.062 | 0.53 |
| 2 | 184 | 0.028 | 0.57 | 168 | 0.039 | 0.54 |
| 3 | 180 | 0.067 | 0.63 | 162 | 0.078 | 0.60 |
| 4 | 179 | 0.074 | 0.59 | 168 | 0.081 | 0.56 |
| 5 | 178 | 0.078 | 0.63 | 162 | 0.117 | 0.57 |
| 6 | 179 | 0.072 | 0.62 | 173 | 0.084 | 0.60 |
| 7 | 178 | 0.080 | 0.57 | 168 | 0.095 | 0.53 |
| 8 | 183 | 0.033 | 0.58 | 165 | 0.046 | 0.54 |
| 9 | 179 | 0.073 | 0.59 | 168 | 0.080 | 0.57 |
| 10 | 180 | 0.064 | 0.55 | 169 | 0.083 | 0.51 |
| Ref. | 177 | 0.086 | 0.75 | 153 | 0.131 | 0.72 |

The electrolyte according to the invention may provide a non water series electrolyte having a high conductivity equivalent to or more than the conductivity of the conventional electrolyte composed of glycols, water and organic acid salt with improved and wide applicability in design of electrolytic capacitor.

What is claimed is:

1. An electrolyte for an electrolytic capacitor comprising an aprotic solvent and a fluorocomplex acid salt of piperazine or piperazine derivative of general formula,

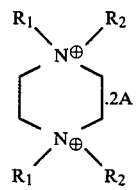

in which $R_1$ and $R_2$ are hydrogen atoms, alkyl group having 1 to 8 carbon atoms, $R_1$ and $R_2$ integrally form integrally a bridged alkylene group and A is a fluorocomplex acid.

2. An electrolyte for an electrolytic capacitor according to claim 1, wherein the aprotic solvent is selected from the group of N-methylformamide, N,N-dimethylformamide, N-ethylformamide, N,N-diethylformamide, N-methylacetamide, N,N-dimethylacetamide, N-ethylacetamide, N,N-diethylacetamide, γ-butyrolactone, N-methyl-2-pyrrolidone, ethylene carbonate, propylene carbonate, dimethyl sulfoxide, acetonitrile or the mixture thereof.

3. An electrolyte for an electrolytic capacitor according to claim 1 or 2, wherein the fluorocomplex acid is tetrafluoroboric acid or hexafluorophosphoric acid.

* * * * *